NOBUYOSHI OHSATO
INVENTOR.

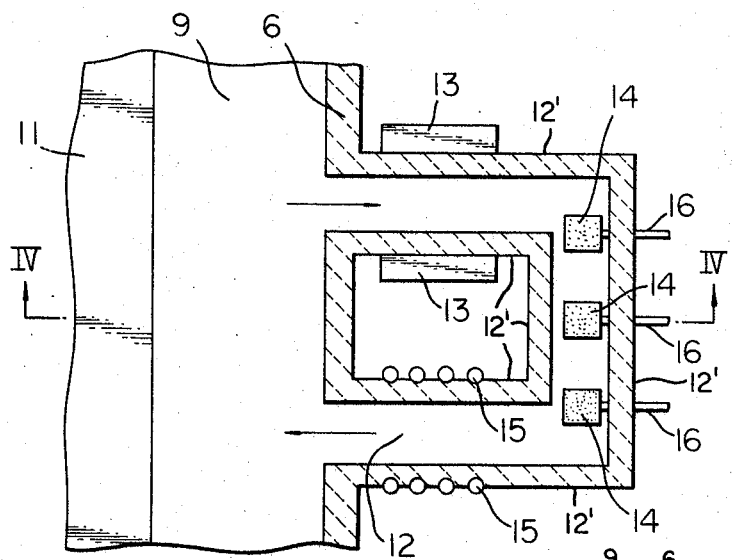
Fig. 3
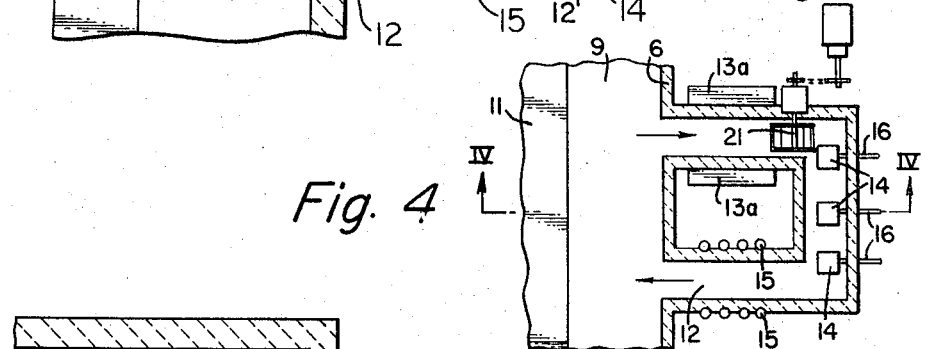
Fig. 3A
Fig. 4
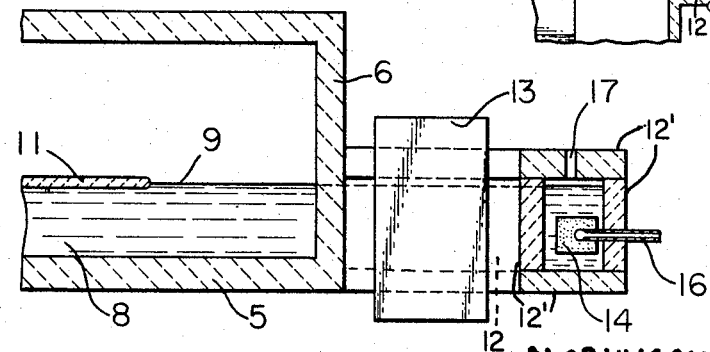
NOBUYOSHI OHSATO
INVENTOR.

United States Patent Office 3,525,601
Patented Aug. 25, 1970

3,525,601
APPARATUS FOR PRODUCTION OF FLAT GLASS WITH FLOAT BATH METAL PURIFYING MEANS
Mobuyoshi Ohsato, Maizuru-shi, Japan, assignor to Nippon Sheet Glass Co., Ltd., Higashi-ku, Osaka, Japan
Filed Nov. 28, 1967, Ser. No. 686,161
Claims priority, application Japan, Dec. 3, 1966, 41/79,516
Int. Cl. C03b 18/02
U.S. Cl. 65—168      5 Claims

ABSTRACT OF THE DISCLOSURE

An apparatus for a continuous production of flat glass by pouring a molten metal from a glass melting furnace onto a molten metal bath and advancing the molten glass in a ribbon form over the molten metal bath includes a device for purifying the molten metal bath which comprises at least one canal with inlet and outlet ends in the vicinity of the outlet of the molten bath to withdraw the molten metal from the bath and return it to the bath, the said canal having at the inlet end means for heating the so withdrawn molten metal, means between the inlet and outlet ends for blowing a reducing gas into the heated molten metal, means at the outlet end for cooling the reduced molten metal, and means for circulating the molten metal all of which contribute to the more expeditious purification of the molten bath metal.

---

Figure 1:
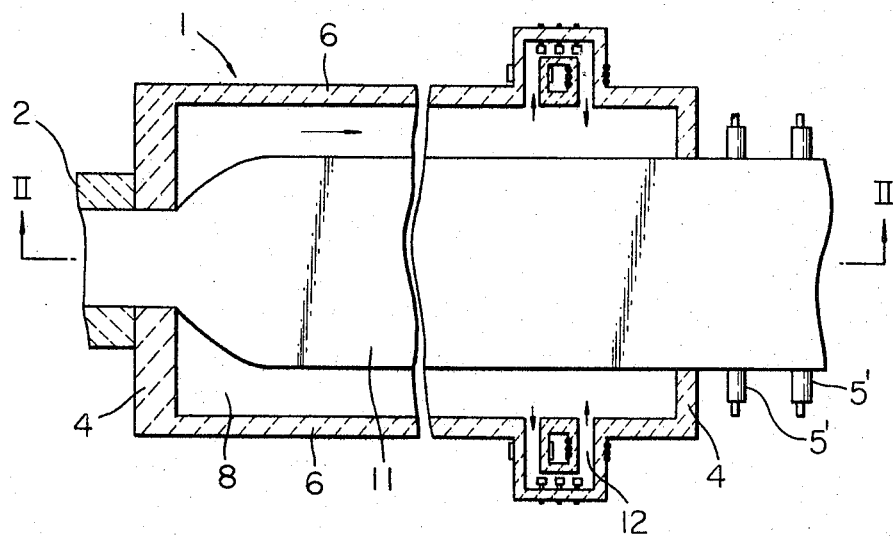

This invention relates to an apparatus for producing flat glass which is provided with a tank structure having a channel at its inlet end for feeding a molten glass into the tank structure.

Delivery rolls are provided outside a discharge end of the tank for delivering a solidified ribbon-like glass. A bath of molten metal having a specific gravity greater than that of glass is confined within the tank structure. A molten glass is fed from an inlet end of this structure, travels in a ribbon form on the surface of a molten metal bath, and is delivered from its discharge end. The tank structure has a canal on a side wall near its discharge end. A flow of molten metal is directed out of the bath through the canal, and heated there to a high temperature. Subsequently, a reducing gas is blown into the molten metal within the canal to reduce metal oxides and metal suphides having been formed in the bath. The molten metal is then cooled to a temperature nearly equal to that before the heating procedure, and returned into the bath.

In brief, the apparatus of the invention is provided with a device on a side wall near the glass discharge end, which device is adapted to heat a molten metal to a high temperature, purify it, cool the purified metal, and return it to the bath.

In the conventional manufacture of flat glass, a molten glass is fed from an inlet end of a tank structure, travelled in a ribbon form on the surface of a molten metal bath, and delivered therefrom by means of rolls, with a space above the bath within the structure covered with a reducing atmosphere. In operating the apparatus, oxides and sulphides of a molten metal are formed in a metal bath by the intrusion of oxygen or sulphur into the tank. Such oxides and sulphides are afloat as dross on the surface of the bath, and adversely affect the glass travelling in a ribbon form on its surface and degrade the quality of glass as a final product. It has been known that the metal oxides and sulphides as above mentioned occur at a portion near a discharge end of the tank structure where the temperature of a bath is relatively low, and that therefore, it is desirable to remove them at this portion.

An object of this invention is to provide tank structure for purifying a molten metal, and adapted to reduce metal oxides and sulphide which exist near a discharge end of a tank structure. This object can be achieved by the provision of means forming a canal on a side wall near the discharge end of the tank structure. Along the canal, a heating means, a means for blowing a reducing gas, and a cooling means are provided in this order, and there is also a molten metal circulating means provided therein.

A molten metal in the bath circulates through the canal along which the heating means, the means for blowing a reducing gas and the cooling means are provided in this order, and returns to the bath.

Figure 2:
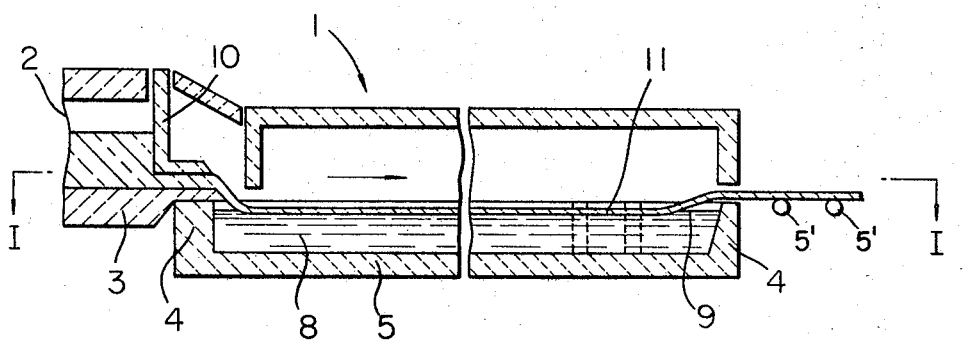

The above and other objects, and advantages of this invention will be apparent from the following detailed description of an embodiment of the invention shown in the drawings in which:

FIG. 1 is a cross-sectional plan view of the tank structure taken substantially along the line I—I of FIG. 2;
FIG. 2 is a cross-sectional side view of the tank structure taken on the line II—II of FIG. 1;
FIG. 3 is an enlarged cross-sectional view of the canal shown in FIG. 1;
FIG. 3A is a view similar to FIG. 3 of a slight modification; and
FIG. 4 is a transverse cross-sectional view taken along the line IV—IV of FIG. 3.

In the drawings, like reference numerals designate the same parts.

A tank structure shown by reference numeral 1 has a channel 2 at its inlet end. The channel 2 extends from a glass melting furnace (not shown) and conducts a molten glass from the furnace. A floor 3 of the channel 2 overlaps an end wall 4 at the inlet end. This tank structure includes a floor 5, side walls 6 and an end wall 4 at the discharge end.

Within the tank structure is confined a molten metal bath 8, for instance, a molten bath of tin or its alloy, having a specific gravity greater than that of glass. The surface level 9 of the bath 8 is below the floor 3 of the channel 2. A molten glass passes below a control gate 10 of channel 2 where its quantity is controlled, and is introduced into the bath. The molten glass which has entered the tank structure flows continuously on the bath as shown by numeral 11, and with the advancement, is reduced in thickness by the influence of its own specific gravity and the surface tension. With the progress of this flow, the glass is gradually increased in viscosity and made into a ribbon-like glass in the desired thickness which is delivered by rolls 5' to the outside of the tank structure. In FIG. 2, a space above the bath 8 within the tank structure is covered with a reducing atmosphere. As shown in FIG. 1, a canal shown by numeral 12 is provided on both side walls near the discharge end of the tank structure. This canal 12 defined by transverse wall means 12' is of such structure that it channels the molten metal out of the tank as shown by arrows and then returns it to the bath. Along the canal in the direction of the flow of the molten metal, an electromagnetic induction heating means 13 (FIG. 3), a reducing gas blowing means 14 and a cooling water tube 15 are provided in this order. The reducing gas blowing means is made of a porous high refractory material, preferably porous graphite or alumina material. A reducing gas is jetted in bubble form into molten metal, and an area of contact between the gas and the metal is increased, whereby a reductive reaction of oxidated impurities in the metal is accelerated. A blowing pipe 16 connected to the blowing means 14 extends through the wall of the canal 12 and is connected to a reducing gas supply source (not shown). The molten metal having a temperature of about 700° C. is taken out into the canal, and heated to about 1000° C. at which a reductive reaction more easily occurs. It is reduced there, cooled down to 700° C., and returned to the bath. The flow of the molten metal is preferably caused by the electromagnetic induction heating means.

The molten metal temperature of the bath 8 confined within the tank structure is high on the inlet side but relatively low on the discharge side where it is about 700° C. Even if the bath is covered with a reducing atmosphere, there is an intrusion of a small amount of oxidizing impurities such as oxygen and sulphur into the tank during the operation of the apparatus, which impurities react with the molten metal to form some amount of metal oxides and metal sulphides within the bath. The formation of these oxides and sulphides takes place near the lower temperature portion, that is, the portion near the discharge end of the tank. The reducing power of a reducing atmosphere is remarkably lowered at low temperatures, and metal oxides and sulphides do not occur at the inlet end because of the substantial, relatively higher temperature. This is the reason for providing the canal 12 near the discharge end in the apparatus of the present invention. An aperture shown by reference numeral 17 in FIG. 4 serves for discharging steam and any gas containing gases generated by the reaction. When a reducing gas, for instance, hydrogen gas, reductively reacts with oxidated impurities in a molten metal, some steam and a gas containing hydrogen sulphide gas are entrained. As the intrusion of this steam and a resultant gas containing hydrogen sulphide into the reducing atmosphere in the tank structure is not desirable, the bubbles of the above-mentioned gas afloat on the surface of the molten metal within the canal are discharged out of it via the aperture 17 so that they may not enter the atmosphere.

In the above-mentioned embodiment, the flowing of the molten metal into the canal 12 and the heating of the molten metal are preferably achieved by the electromagnetic induction heating means. But this can be replaced by other means such as pump 21 (FIG. 3A) and other ordinarily conceivable heating means. FIG. 3A is an example of an alternate form of separate ordinary heating means 13a, with separate circulating inducing pump means 21.

However, if a part of the canal 12 is declined against the horizontal plane and a reducing gas in a sufficiently large amount is jetted out from the blowing means 14 along the direction of the declining, the bubbles of the gas from the blowing means 14 flow together with the molten metal, and imparts the flow of the molten metal therefrom and back to the tank. Such contrivance then obviates the necessity of the above-mentioned pump 21.

It should be noted that the invention is not necessarily limited in any way to the specific above described embodiments.

I claim:

1. An apparatus for a continuous production of flat glass which includes means for pouring a molten glass from a glass melting furnace onto a molten metal bath supported by suitable means, means for advancing the molten glass in a ribbon form over the molten metal bath toward its downstream outlet end, and a device for purifying the molten metal bath by reducing impurities, including metal compounds contained therein, which device comprises:

(a) means including transverse walls defining at least one canal having inlet and outlet ends adjacent to the downstream outlet end of said bath, with means connecting both ends of said canal so as to communicate with the bath and positioned below the surface of said bath;

(b) said canal having heating means in contact with the inlet end transverse walls of said canal for heating the portion of the metal bath within the canal so that the temperature of the bath metal therein may be increased to a higher temperature at which the impurities thereof are easily reduced to the molten bath metal;

(c) means immersed within the molten bath metal within the canal between said inlet and outlet ends of said canal for blowing a reducing gas into said canal so that a reaction between the reducing gas and the impurity metal compounds within the molten metal occurs at a temperature higher than when it otherwise would occur in said molten metal bath to cause metal compounds to be more rapidly reduced to said bath metal;

(d) cooling means provided adjacent the outlet end transverse walls of said canal for cooling the heated bath metal within said canal down to a temperature equal to the temperature of the molten metal comprising said bath; and (e) circulating means for introducing the molten metal of said bath into said canal through said inlet end of the canal and returning it to the bath through said outlet end of the canal.

2. The apparatus according to claim 1 wherein said circulating means comprises pump means for the circulation of the molten metal.

3. The apparatus according to claim 1 wherein an electro-magnetic induction heating system is used for effecting both the heating and the circulation of the molten metal.

4. The apparatus according to claim 1 wherein a part of said gas blowing means immersed in the molten bath metal is made of porous graphite.

5. The apparatus according to claim 1 wherein a part of said gas blowing means immersed in the molten metal is made of a porous, highly refractory alumina material.

References Cited

UNITED STATES PATENTS

| | | | |
|---|---|---|---|
| 3,083,422 | 4/1963 | Finkl | 75—49 |
| 3,330,635 | 7/1967 | Loukes | 65—99 X |
| 3,337,319 | 8/1967 | Edwards | 65—99 X |
| 3,317,301 | 5/1967 | Robinson | 65—182 |

S. LEON BASHORE, Primary Examiner

E. R. FREEDMAN, Assistant Examiner

U.S. Cl. X.R.

65—27, 65, 99, 182